(12) United States Patent
Shanan et al.

(10) Patent No.: US 10,797,738 B2
(45) Date of Patent: Oct. 6, 2020

(54) SEGMENTED RECEIVER FOR WIRELESS COMMUNICATIONS

(71) Applicant: Analog Devices, Inc., Norwood, MA (US)

(72) Inventors: Hyman Shanan, Franklin Park, NJ (US); Saeed Aghtar, Hillsborough, NJ (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 16/172,119

(22) Filed: Oct. 26, 2018

(65) Prior Publication Data

US 2020/0136663 A1 Apr. 30, 2020

(51) Int. Cl.
*H04B 1/10* (2006.01)
*H04B 7/185* (2006.01)

(52) U.S. Cl.
CPC .............. *H04B 1/10* (2013.01); *H04B 7/185* (2013.01)

(58) Field of Classification Search
CPC ...... H04B 1/26; H04B 1/06–76; H04B 7/185; H03F 3/181–19
See application file for complete search history.

(56) References Cited

U.S. PATENT DOCUMENTS

| 5,678,222 | A | * | 10/1997 | Hornak | H03D 7/00 327/113 |
| 8,213,889 | B2 | | 7/2012 | Shin et al. | |
| 8,805,297 | B2 | | 8/2014 | Hanevich et al. | |
| 9,698,925 | B2 | | 7/2017 | Yi et al. | |
| 2007/0207752 | A1 | * | 9/2007 | Behzad | H04B 1/18 455/132 |
| 2013/0279631 | A1 | * | 10/2013 | Bowers | H04L 27/04 375/300 |
| 2013/0293322 | A1 | * | 11/2013 | Alderton | H01P 1/207 333/208 |
| 2014/0018026 | A1 | * | 1/2014 | Klepser | H04B 1/005 455/230 |
| 2014/0134960 | A1 | * | 5/2014 | Tasic | H03F 3/193 455/73 |
| 2014/0266439 | A1 | * | 9/2014 | Suetinov | H03F 3/45237 330/254 |

(Continued)

FOREIGN PATENT DOCUMENTS

CN 102305934 1/2012

*Primary Examiner* — Raymond S Dean
(74) *Attorney, Agent, or Firm* — Knobbe, Martens, Olson & Bear, LLP

(57) ABSTRACT

Aspects of this disclosure relate to a segmented receiver for a wireless communication system. The segmented receiver includes a first receiver segment and a second receiver segment configured to receive respective radio frequency signals. The radio frequency signals can be orthogonally polarized. Branch circuits in each receiver segment can provide a radio frequency signal to different mixers. The different mixers can be included in different receiver segments and receive local oscillator signals from independent local oscillators. Each receiver segment can process a different bandwidth of the radio frequency signal. Two different bandwidths of the radio frequency signal can be processed concurrently by different receiver segments.

20 Claims, 11 Drawing Sheets

(56) References Cited

U.S. PATENT DOCUMENTS

| | | | |
|---|---|---|---|
| 2015/0288467 A1* | 10/2015 | Kahrizi | H04L 5/001 370/241 |
| 2015/0381265 A1* | 12/2015 | Runyon | H01Q 1/288 455/13.3 |
| 2016/0359510 A1* | 12/2016 | Scott | H03F 3/72 |
| 2017/0047956 A1* | 2/2017 | Lu | H03F 1/26 |
| 2017/0310520 A1 | 10/2017 | Aghtar | |

* cited by examiner

SEGMENTED RECEIVER FOR WIRELESS COMMUNICATIONS

FIELD OF DISCLOSURE

Embodiments of the present disclosure relate to communications and, in particular, to receivers for communications systems.

BACKGROUND

Communications systems can include an antenna to receive a radio frequency signal and a receiver to process the radio frequency signal received by the antenna. A satellite communication system is an example communications system in which a radio frequency signal from a first location on earth can be provided to an artificial satellite that is arranged to transmit a signal to another location on earth. Satellite communications systems can be used for a variety of applications, such as Internet, television, radio, telephone, and military applications.

Receivers in satellite communication systems can receive signals with a relatively high bandwidth of several gigahertz (GHz). Processing signals with such a bandwidth can encounter challenges with noise and/or linearity specifications.

SUMMARY OF THE DISCLOSURE

The innovations described in the claims each have several aspects, no single one of which is solely responsible for its desirable attributes. Without limiting the scope of the claims, some prominent features of this disclosure will now be briefly described.

One aspect of this disclosure is a segmented receiver for a wireless communications system. The segmented receiver includes a first receiver segment and a second receiver segment. The first receiver segment includes a first input node configured to receive a radio frequency signal, a first branch circuit coupled to the first input node, a second branch circuit coupled to the first input node, and a first mixer. The second receiver segment includes a second input node configured to receive a second radio frequency signal, a third branch circuit coupled to the second input node, a fourth branch circuit coupled to the second input node, and a second mixer. An output of the first branch circuit and an output of the third branch circuit are coupled to an input of the first mixer. An output of the second branch circuit and an output of the fourth branch circuit are coupled to an input of the second mixer.

The first branch circuit can include a first low noise amplifier, and the second branch circuit can include a second low noise amplifier. The third branch circuit can include a third low noise amplifier, and the fourth branch circuit can include a fourth low noise amplifier. The segmented receiver can be configured to perform active switching to power down the first low noise amplifier such that the first low noise amplifier is powered down while the third low noise amplifier is powered on. The first branch circuit can include an adjustable voltage-to-current converter coupled between the first low noise amplifier and the first mixer.

The radio frequency signal and the second radio frequency signal can be orthogonally polarized signals. The radio frequency signal can have a frequency in a range from 17.3 gigahertz to 21.2 gigahertz.

The segmented receiver can be configured to concurrently process a first bandwidth of the radio frequency signal using the first mixer and a second bandwidth of the radio frequency signal using the second mixer. The first bandwidth and the second bandwidth can each span at least 300 megahertz.

The first receiver segment can include a first local oscillator in communication with the first mixer and the second receiver segment can include a second local oscillator in communication with the second mixer, in which the first local oscillator is independent of the second local oscillator.

The first receiver segment can include an input low noise amplifier having an input coupled to the first input node and an output split to the first branch circuit and the second branch circuit.

Another aspect of this disclosure is a method of processing a received radio frequency signal in a segmented receiver. The method includes receiving the radio frequency signal at an input node of a first receiver segment; processing the radio frequency signal in a first branch circuit and a second branch circuit of the first receiver segment; down converting the radio frequency signal using a first mixer of first receiver segment, wherein the first mixer has an input coupled to an output of the first branch circuit; and down converting the radio frequency signal using a second mixer of a second receiver segment, wherein the second mixer has an input coupled to an output of the second branch circuit.

The method can include processing a first bandwidth of the radio frequency signal using circuitry coupled to an output of the first mixer; and processing a second bandwidth of the radio frequency signal using circuitry coupled to an output of the second mixer, wherein the first bandwidth and the second bandwidth are spaced apart in a frequency domain.

The method can include providing a first local oscillator signal to the first mixer and second local oscillator signal to the second mixer, wherein the first local oscillator signal is independent of the second local oscillator signal.

The method can include powering down circuitry of the first branch circuit and the second branch circuit of the first receiver segment; and while the circuitry of the first branch circuit and the second branch circuit of the first receiver segment are powered down, processing a second radio frequency signal in a third branch circuit of the second receiver segment, wherein the first mixer has an input coupled to an output of the third branch circuit.

The method can include providing a second radio frequency signal to a second input node of the second receiver segment, wherein the radio frequency signal and the second radio frequency signal are orthogonally polarized.

The radio frequency signal can have a frequency in a range from 17.3 gigahertz to 21.2 gigahertz.

Another aspect of this disclosure is a radio frequency system with a segmented receiver for a wireless communications system. The radio frequency system includes a polarizer, a first receiver segment, and a second receiver segment. The polarizer is configured to provide a first radio frequency signal at a first polarizer node and a second radio frequency signal at a second polarizer node, wherein the first radio frequency signal and the second radio frequency signal are orthogonally polarized. The first receiver segment includes a first input node electrically connected to the first polarizer node, a first low noise amplifier coupled to the first input node, a second low noise amplifier coupled to the first input node, and a first mixer. The second receiver segment includes a second input node electrically connected to the second polarizer node, a third low noise amplifier coupled to the second input node, a fourth low noise amplifier coupled to the second input node, and a second mixer. An output of the first low noise amplifier and an output of the third low noise amplifier are coupled to an input of the first mixer. An output of the second low noise amplifier and an output of the fourth low noise amplifier are coupled to an input of the second mixer.

The radio frequency system can include a diplexer coupled between the first polarizer node and the first input node and also coupled between the second polarizer node and the second input node.

The first receiver segment can include a local oscillator electrically connected to the first mixer, in which the local oscillator is configured to perform phase shifting.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION

Figure 1A:
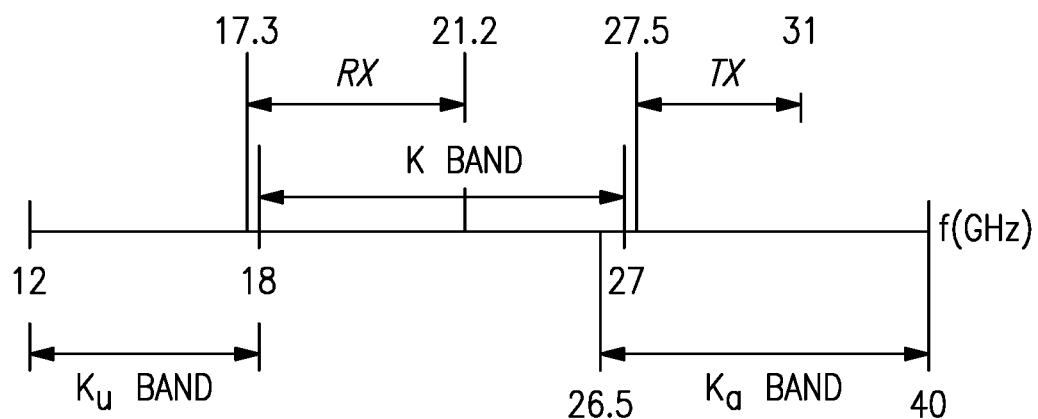
FIG. 1A is a diagram of frequency ranges associated with satellite communications applications.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings provided herein are for convenience only and do not necessarily affect the scope or meaning of the claims.

In the satellite communication space, a capacity bottleneck has been encountered in receiver architectures with 500 megahertz (MHz) radio frequency (RF) bandwidth. New systems may include increased bandwidth. For instance, some systems can have a maximum RF bandwidth from 500 MHz to 1 gigahertz (GHz). In certain applications, the increased bandwidth can be in the K-band between 17.3 GHz and 21.2 GHz. With this increased bandwidth, a satellite communications system can, for example, deliver 100+ megabits per second (Mbps) residential internet service and/or a 10× increase in user capacity.

This disclosure provides receiver architectures for a communication system that includes segmented receivers. The segmented receivers can be millimeter-wave (mmWave) receivers. Receiver architectures disclosed herein can include independent frequency synthesizers for each receiver segment. Each receiver segment can be separately tuned to any RF channel within a bandwidth of interest. In the context of a receiver arranged to process a signal in K-band between 17.3 GHz and 21.2 GHz, the segmented receiver can aggregate 1 GHz RF channels within the K-band. In this example, each receiver segment can tune to any channel within the 3.9 GHz bandwidth of interest. For instance, one receiver segment can receive and process two adjacent 500 MHz RF channels or a 1 GHz bandwidth. As another example, two segmented receivers can receive four adjacent 500 MHz RF channels or a total of two 1 GHz RF channels. The segmented receiver can scale for three or more segmented receivers. Accordingly, a scalable architecture is disclosed to accommodate increases in system bandwidth capacity.

In embodiments disclosed herein, a segmented receiver can include two receiver segments arranged to receive orthogonally polarized radio frequency signals. Branch circuits in each receiver segment can provide a radio frequency signal to different mixers. Each branch circuit can include a low noise amplifier. The low noise amplifiers can be powered down and powered up to implement active switching. The different mixers can be included in different receiver segments and receive local oscillator signals from independent frequency synthesizers. Each receiver segment can process a different bandwidth of the radio frequency signal. Two different bandwidths of the radio frequency signal can be processed concurrently by different receiver segments.

Segmented receivers disclosed herein can meet difficult specifications for processing a relatively wide bandwidth in a communication system. For instance, segmented receivers disclosed herein can meet specifications for processing a 1 GHz RF bandwidth in satellite communications applications. Segmented receiver architectures disclosed herein can avoid using analog-to-digital converters (ADCs) arranged to convert analog signals within an entire band width of interest (e.g., a bandwidth from 17.3 GHz to 21.2 GHz) that can have aggressive noise figure and/or linearity specifications. Embodiments discussed herein can include an ADC and an mmWave-to-bits signal chain on a single chip to provide a single chip technical solution.

FIG. 1A is a diagram of frequency ranges associated with satellite communications applications. The K Band is part of the radio spectrum that can be used in satellite communications systems. The receive band in satellite communications systems can span from 17.3 GHz to 21.2 GHz and the transmit band can span from 27.5 GHz to 31 GHz. The transmit band is within the K above Band (Ka Band). The receive band is mostly in the K-Band and partly in the K under Band (Ku Band). Signals in these bands can have desirable properties for satellite communications.

Figure 1B:
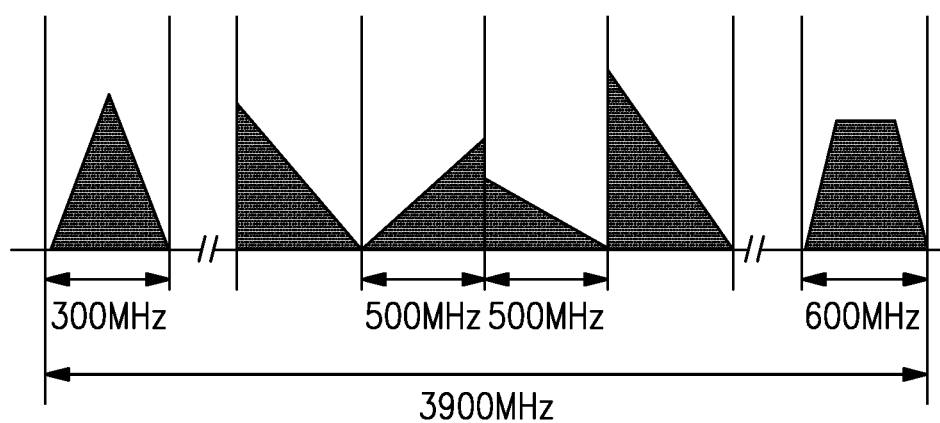
FIG. 1B is a diagram of signals within the receive band of an example satellite communication signal.

FIG. 1B is a diagram of signals within the receive band of an example satellite communication signal. The receive signal has a 3.9 GHz bandwidth. This bandwidth can be from 17.3 GHz to 21.2 GHz. Within this bandwidth, signals having various bandwidths such as 300 MHz, 500 MHz, and 600 MHz are present.

With reference to FIG. 1B, certain satellite communications system specifications will be discussed. Some satellite communication system specifications include being able to receive (1) two adjacent RF channels with bandwidth between 300 MHz and 500 MHz within the K-band and (2) two non-adjacent RF channels with bandwidth between 300 MHz and 600 MHz within the K-band. It can also be desirable to provide a flexible design to trade-off of power consumption versus RF channel bandwidth to reduce system heat dissipation. Supporting orthogonal polarization where two 300 MHz to 600 MHz RF channels can be received simultaneously on either right hand (RH) polarization or left hand (LH) polarization can be desirable. Embodiments disclosed herein can meet some or all of these specifications. Such embodiments include an mmWave-to-bits transceiver platform for various applications in mmWave frequency range.

Processing and digitizing the entire receive band bandwidth of 3.9 GHz shown in FIG. 1B can involve using an ADC that is difficult to implement while meeting design specifications, such as power consumption. Moreover, such an architecture is not easily scalable in terms of bandwidth versus power consumption. This can be due to the mainly static power consumed in the ADC and Serializer/Deserializer (SerDes) lanes.

A design specification in satellite communication systems can be to receive any two 500 MHz channels within the 3.9 GHz receive band. Another design specification in satellite communication systems can be to receive any two 1 GHz channels within the 3.9 GHz receive band. Concurrently processing non-adjacent channels can be difficult without independent local oscillator signals.

With multiple local oscillator signals, different segmented receivers can concurrently be tuned to different channels within the receive band. Examples of receiving various signals concurrently within the receive band will be discussed with reference to FIGS. 2A to 2C. The principles and advantages related to FIGS. 2A to 2C can be applied to any other suitable channel bandwidth, such as 1 GHz. The principles and advantages related to FIGS. 2A to 2C can be applied to any other suitable receive bandwidth. Segmented receivers discussed herein can process received signals in accordance with one or more of the diagrams of FIGS. 2A to 2C.

Figure 2A:
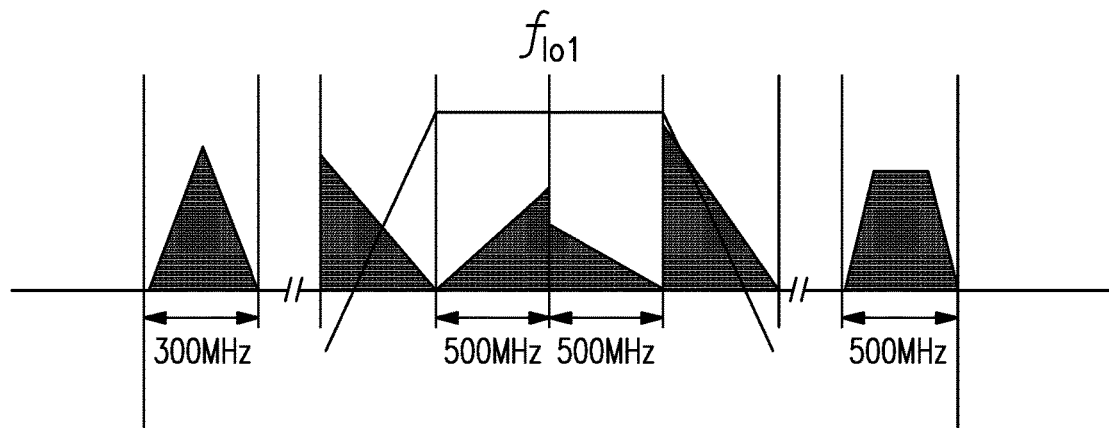
FIG. 2A is a diagram that illustrates that a local oscillator signal of a receiver segment can be used to receive two adjacent channels.

FIG. 2A is a diagram that illustrates that a local oscillator signal $F_{LO1}$ of a receiver segment can be used to receive two adjacent 500 MHz channels. For example, the local oscillator signal can be used to down convert a received radio frequency signal such that two adjacent channels are processed by circuitry coupled to an output of a mixer.

Figure 2B:
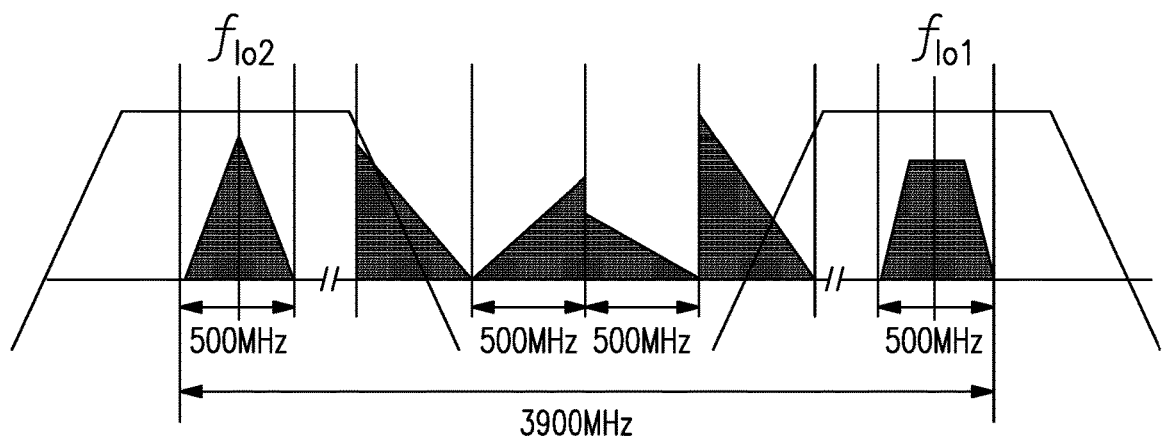
FIG. 2B is a diagram that illustrates that two separately tunable local oscillator signals can tune different receiver segments to concurrently receive non-adjacent channels of a receive band.

FIG. 2B is a diagram that illustrates that two separately tunable local oscillator signals $F_{LO1}$ and $F_{LO2}$ can tune different receiver segments to concurrently receive non-adjacent 500 MHz channels of the receive band. Each receiver segment can down convert and process one of the non-adjacent channels of the receive band.

Figure 2C:
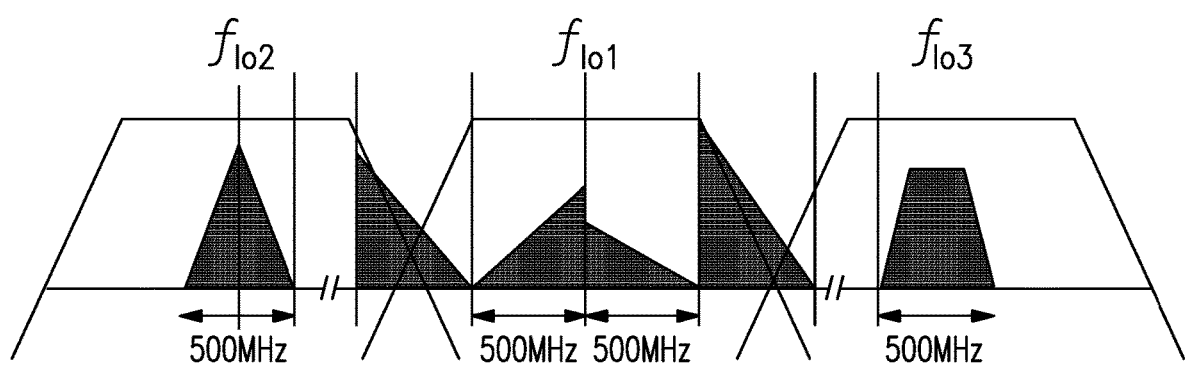
FIG. 2C is a diagram that illustrates that three independent local oscillator signals can tune three receiver segments to receive non-adjacent channels of the receive band.

FIG. 2C is a diagram that illustrates that three independent local oscillator signals $F_{LO1}$, $F_{LO2}$, and $F_{LO3}$ can tune three receiver segments to receive non-adjacent channels of the receive band. As shown in FIG. 2C, with segmented receivers disclosed herein, three non-adjacent channels can be concurrently processed by a segmented receiver. The principles and advantages disclosed herein are scalable and can be applied to concurrently processing more than three channels in respective receiver segments.

A segmented receiver is a technical solution to a complex design challenge where digitizing an RF bandwidth of 3.9 GHz can be replaced with digitizing a 1 GHz RF bandwidth that can include any two 500 MHz RF channels within the 3.9 GHz bandwidth of a received RF signal. This technical solution can be applied to digitizing other non-adjacent channel bandwidths within a receive bandwidth. Moreover, the non-adjacent channels can have bandwidths that are different from each other. Alternatively or additionally, adjacent channels can be processed together with another non-adjacent channel in accordance with principles and advantages disclosed herein.

Figure 3:
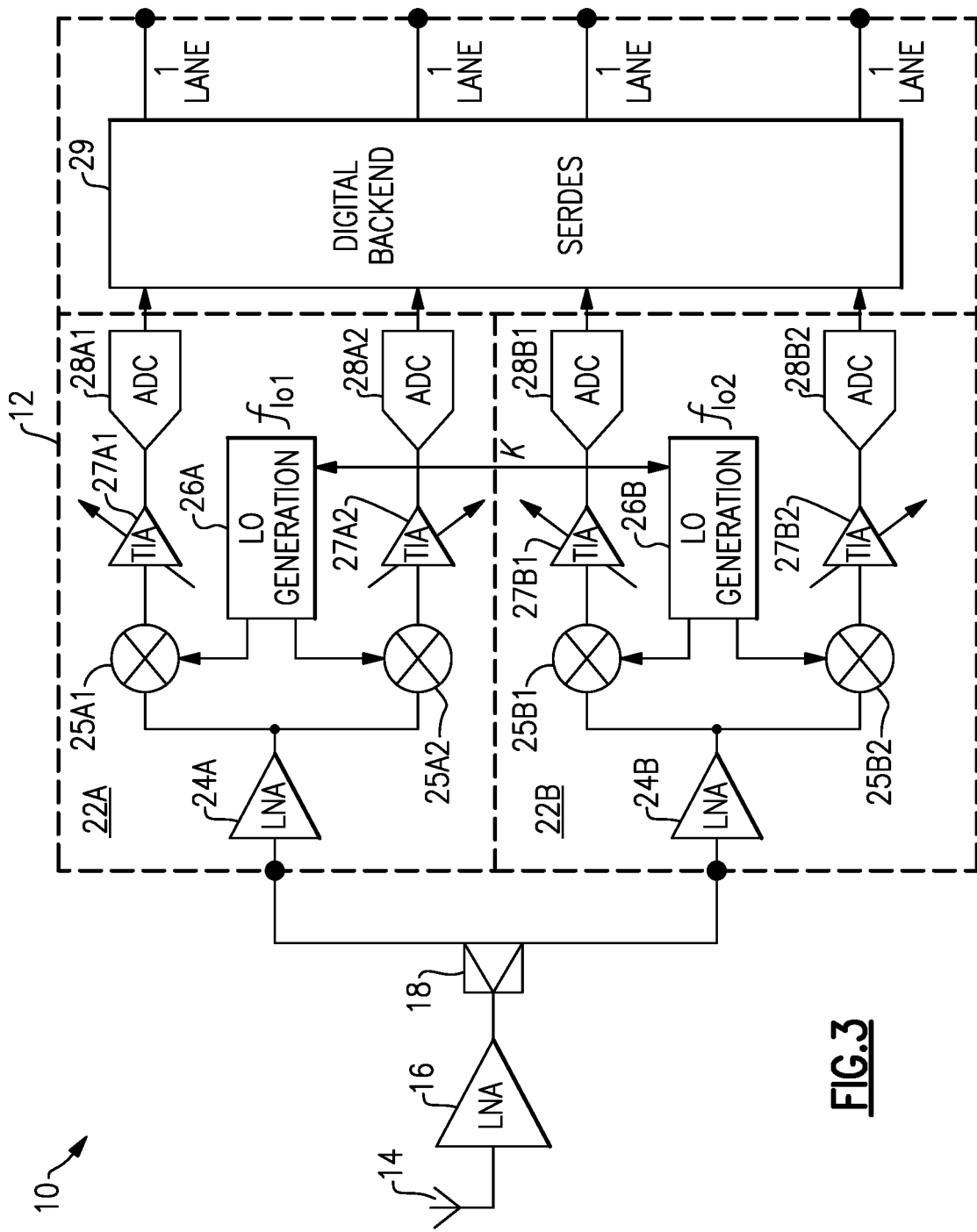
FIG. 3 is a schematic diagram of a communication system that includes a segmented receiver according to an embodiment.

FIG. 3 is a schematic diagram of a communication system 10 that includes a segmented receiver 12 according to an embodiment. As illustrated, the communication system 10 includes the segmented receiver 12, an antenna 14, a low noise amplifier 16, and a signal splitter 18. The antenna 14 is configured to receive a radio frequency signal. The low noise amplifier 16 is configured to amplify the radio frequency signal. The splitter 18 is arranged to split the amplified radio frequency signal to different receiver segments of the segmented receiver 12. Although the splitter 18 is configured to split the amplified signal to two receiver segments in the communication system 10, a splitter 18 can alternatively split the amplified radio frequency signal to three or more receiver segments in certain applications.

The segmented receiver 12 includes two similar receiver segments 22A and 22B and a digital backend SerDes 29. The signal splitter 18 splits the amplified radio frequency signal from the low noise amplifier 28 to the receiver segments 22A and 22B. The local oscillators 26A and 26B of the receivers segments 22A and 22B, respectively, are separated by a suitable distance to provide sufficient isolation between the local oscillators 26A and 26B. This distance, denoted K in FIG. 3, can be in a range from 0.5 millimeters (mm) to 1 mm in certain applications. Physical separation between each of the receiver segments in any of the embodiments disclosed herein can provide a sufficient level of isolation in a frequency division duplexing (FDD) mode of operation and/or other modes of operation.

In certain applications, a single receiver segment 22A or 22B can receive two adjacent 300 MHz to 500 MHz RF channels or a single 300 MHz to 600 MHz RF channel while the second receiver is powered down, which can reduce the power consumption by approximately half. Any two non-adjacent 300 MHz to 600 MHz RF channels in a 3.9 GHz receive band can be received concurrently by tuning the two receivers to two different RF channels using independent local oscillators. In applications where power consumption specifications are relatively less demanding, each receiver can receive a 300 MHz to 600 MHz RF channel simultaneously. This can relax design specification for the baseband bandwidth to 300 MHz.

The first receiver segment 22A includes a first low noise amplifier 24A, mixers 25A1 and 25A2, a local oscillator 26A, transimpedance amplifiers 27A1 and 27A2, and ADCs 28A1 and 28A2. Similarly, the second receiver segment 22B includes a second low noise amplifier 24B, mixers 25B1 and 25B2, a local oscillator 26B, transimpedance amplifiers 27B1 and 27B2, and ADCs 28B1 and 28B2.

Operation of the first receiver segment 22A will now be discussed. The first low noise amplifier 24A amplifies a radio frequency signal received from the signal splitter 18. Mixers 25A1 and 25A2 can receive local oscillator signals from the local oscillator 26A that are 90° out of phase with each other. The mixers 25A1 and 25A2 can down convert the output of the low noise amplifier 25A to generate in-phase and out-of-phase signals, respectively. These signals can be amplified by the transimpedance amplifiers 27A1 and 27A2, respectively. The transimpedance amplifiers 27A1 and 27A2 can have adjustable gain as illustrated. The output signals from the transimpedance amplifiers 27A1 and 27A2 can be digitized by ADCs 28A1 and 28A2, respectively. The digital output signals from the ADCs 28A1 and 28A2 can be provided to the digital backend SerDes 29. The digital backend SerDes can provide outputs corresponding to the in-phase signal and the out-of-phase signals in respective lanes. Each lane can have a speed of approximately 12.375 gigabits per seconds (Gbps) in certain applications.

In certain embodiments, segmented receiver architectures disclosed herein can provide at least a 3 times reduction in power consumption for the same RF channel bandwidth compared to designs with a zero-intermediate frequency receiver and a ADC that process the entire receive bandwidth. The ADCs in the segmented receivers disclosed herein can account for a significant amount of the power reduction.

With the segmented receiver 12, baseband circuitry (e.g., transimpedance amplifiers and ADCs) of each receiver can be simplified. The transimpedance amplifiers and ADCs can have a maximum bandwidth of 500 MHz, for example. Each receiver segment can be electrically connected to have half of the SerDes lanes of the equivalent single receiver.

In certain applications, it can be desirable to double the receiver bandwidth using right hand polarized (RHP) and left hand polarized (LHP) signals in which the RHP and LHP signals are orthogonally polarized. Segmented receivers can receive any two 500 MHz channels in the 3.9 GHz receive band from either orthogonal polarization or both orthogonal polarizations.

Figure 4A:
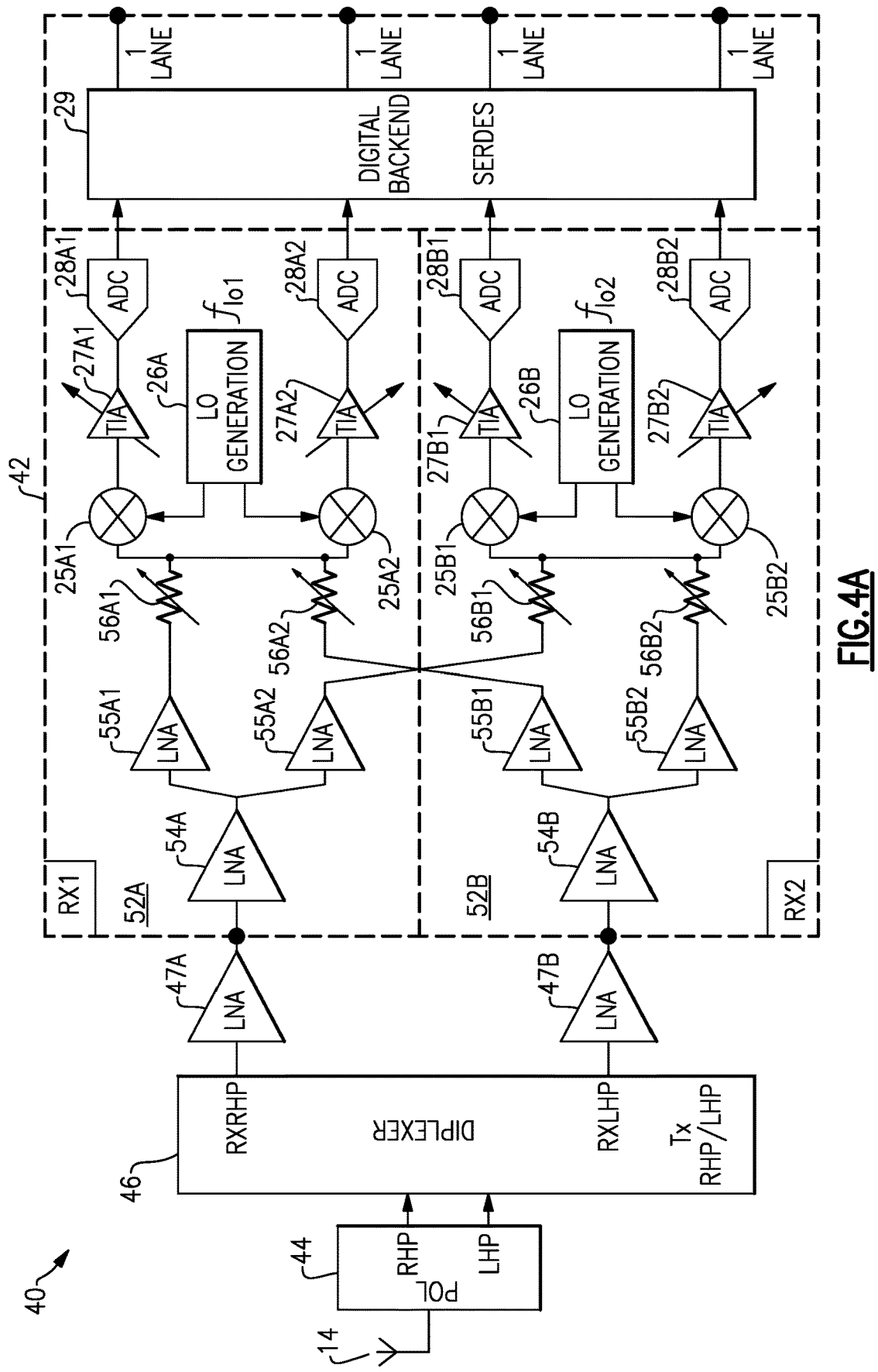
FIG. 4A is a schematic diagram of a communication system that includes a segmented receiver according to another embodiment.

FIG. 4A is a schematic diagram of a communication system 40 that includes a segmented receiver 42 according to an embodiment. In the communication system 40, two receiver segments 52A and 52B can be used to receive RF channels from either the RHP or the LHP polarization planes at a given time. Each channel can be a 500 MHz RF channel, for example. With orthogonal polarization, receiver bandwidth can be doubled. The segmented receiver 42 is a cost and area efficient technical solution.

As illustrated in FIG. 4A, the communication system 40 includes the segmented receiver 42, an antenna 14, a polarizer 44, a diplexer 46, and low noise amplifiers 47A and 47B. The antenna 14 is configured to receive a radio frequency signal. The polarizer 44 can polarize the radio frequency signal and provide a RHP signal at a first polarizer node and a LHP signal at a second polarizer node. The RHP signal and the LHP signal are orthogonally polarized. The diplexer 46 can provide the RHP signal to the low noise amplifier 47A and provide the LHP signal to the low noise amplifier 47B.

To receive two RF channels on each of the RHP and LHP planes, a switching scheme can provide signals from the two polarization planes to the mixers of the receiver segments 52A and 52B of the segmented receiver 42. The first receiver segment 52A includes a first stage low noise amplifier 54A and two second stage low noise amplifiers 55A1 and 55A2. The first stage low noise amplifier 54A is coupled to mixers 25A1 and 25A2 by a first branch circuit and coupled to mixers 25B1 and 25B2 by a second branch circuit. The first branch circuit includes a second stage low noise amplifier 55A1 and a voltage-to-current converter 56A1. Any of the voltage-to-current converters disclosed herein, such as the voltage-to-current converter 56A1, can be programmable. Similarly, the second branch circuit includes a second stage low noise amplifier 55A2 and a voltage-to-current converter 56B1. A voltage mixer can be implemented in place of a voltage-to-current converter in certain applications.

As illustrated in FIG. 4A, one second stage low noise amplifier 55A1 is electrically connected to mixers 25A1 and 25A2 of the first receiver segment 52A by way of the adjustable voltage-to-current converter 56A1. The mixers 25A1 and 25A2 can each include any suitable circuitry to down convert a radio frequency signal based on a respective local oscillator signal. For instance, the mixer 25A1 can be a double-balanced passive mixer. The other second stage low noise amplifier 55A2 is connected to mixers 25B1 and 25B2 of the second receiver segment 52B by way of an adjustable voltage-to-current converter 56B1. Accordingly, the low noise amplifier stages of the first receiver segment 52A can route a received RHP signal to mixers of two receiver segments 52A and 52B so that different channels of the RHP signal can be processed by circuitry of the different respective receiver segments 52A and 52B. Similarly, the low noise amplifier stages of the second receiver segment 52B can route a received LHP signal to mixers of two receiver segments 52A and 52B so that different channels of the LHP signal can be processed by circuitry of the different respective receiver segments 52A and 52B.

The local oscillators 26A and 26B can generate independent local oscillator signals to tune the receiver segments 52A and 52B, respectively, to receive different channels. Phase shifting can be performed using the local oscillators 26A and/or 26B of the receiver segments. The phase shifting can be implemented in digital beamforming applications. The circuitry coupled to the output of the mixers 25A1, 25A2, 25B1, and 25B2 can function as described with reference to FIG. 3.

The segmented receiver architecture in FIG. 4A uses active splitting instead of explicit switches. In the communications system 40, active splitting is incorporated as part of a multi-stage low noise amplifier that drives a current-mode mixer. Accordingly, no additional circuitry is implemented for a splitter. In addition, active splitting takes away the impact that switch-based splitting would have on noise figure.

Depending on channelization specifications whether one or two RF channels are desired on each of the polarization planes or both, either one or two of the low noise amplifier second stages are enabled in an active switching scheme. For example, if two 500 MHz RF channels are being received on the RHP, the low noise amplifiers 55A1 and 55A2 are enabled and the low noise amplifiers 55B1 and 55B2 are disabled. In this example, the low noise amplifiers 47B and/or 54B can also be disabled. If two 500 MHz RF channels are being received on the LHP, the low noise amplifiers 55B1 and 55B2 are enabled and the low noise amplifiers 55A1 and 55A2 are disabled. In this example, the low noise amplifiers 47A and/or 54A can also be disabled. For receiving a first 500 MHz RF channel are being on the RHP and a second 500 MHz RF channel on the LHP, one low noise amplifier in each of the RHP and LHP paths (e.g., low noise amplifiers 55A1 and 55B2) is enabled and the other low noise amplifier in the RHP and LHP paths (e.g., low noise amplifiers 55A2 and 55B1) is disabled.

Although the two second stage low noise amplifiers are included in each receiver segment 52A and 52B in the segmented receiver 42 of FIG. 4A, more than two second stage low noise amplifiers can be included and coupled to corresponding mixers in different receiver segments in certain applications.

Figure 4B:
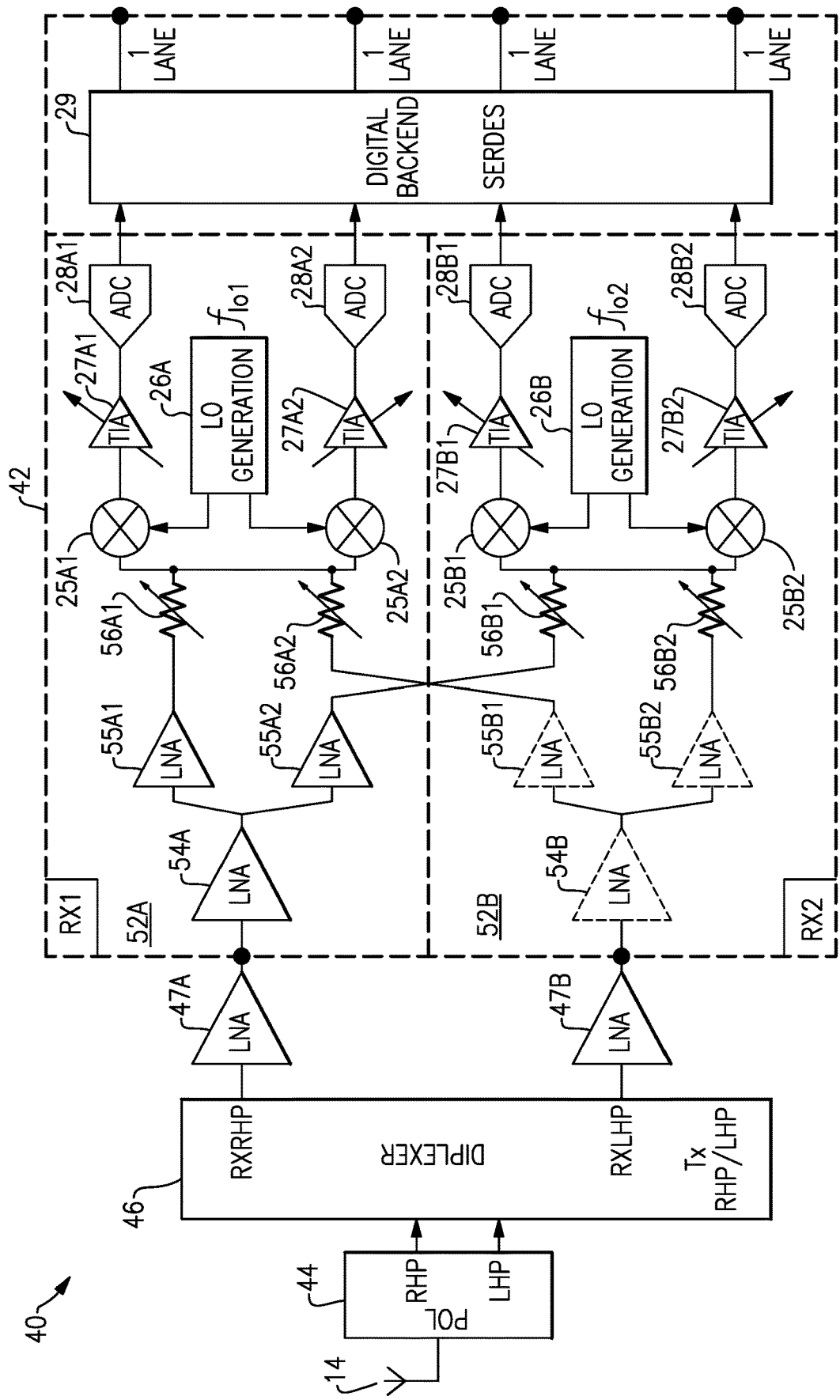
FIG. 4B is a schematic diagram of the communication system of FIG. 4A that illustrates a first active switching state.
Figure 4C:
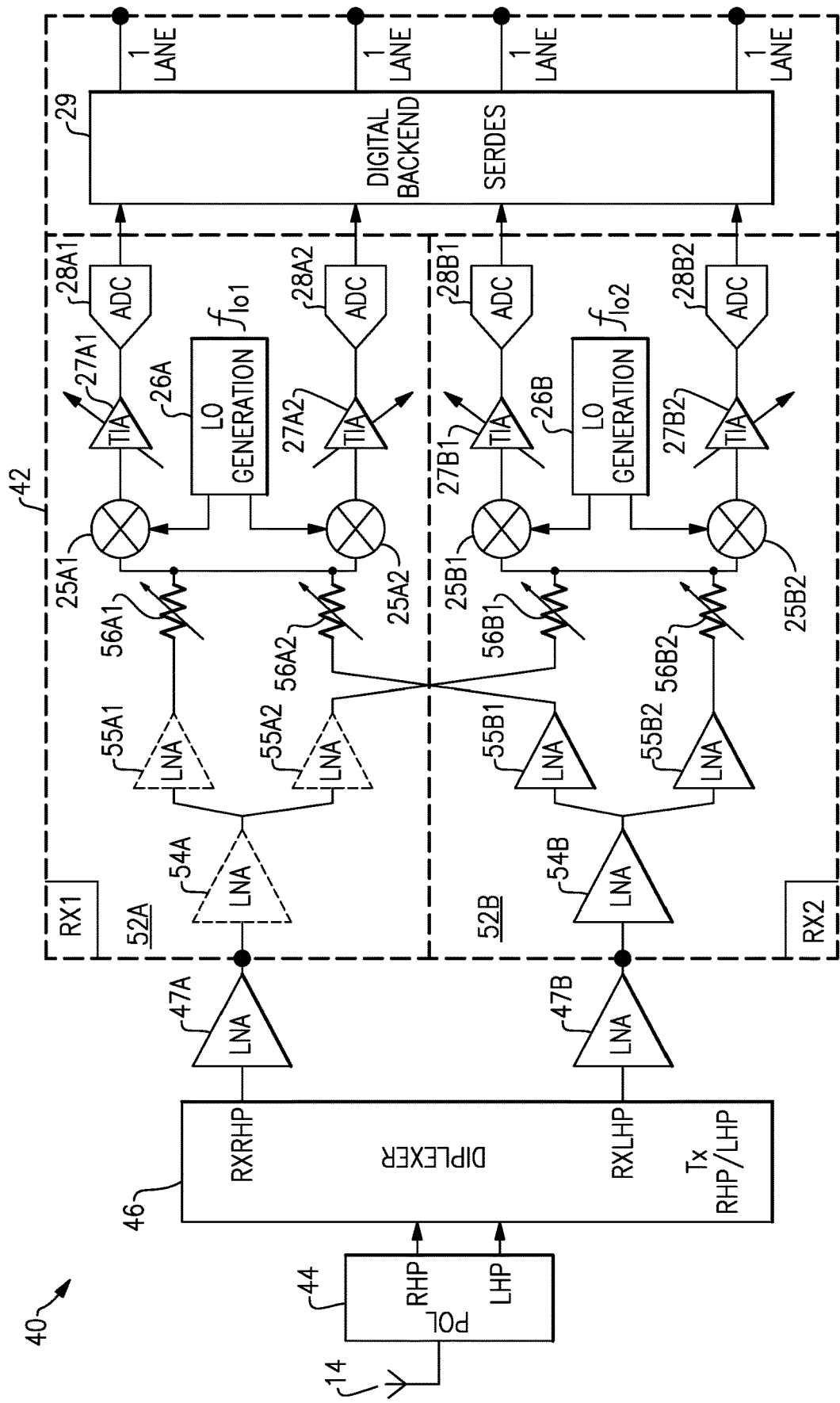
FIG. 4C is a schematic diagram of the communication system of FIG. 4A that illustrates a second active switching state.

FIGS. 4B and 4C illustrate different active switching states of the communication system 40. FIG. 4B illustrates a first active switching state of the communication system 40. An RHP signal can be received and processed in the first active switching state. In the first active switching state, the low noise amplifiers 54A, 55A1, and 55A2 of the first receiver segment 52A are active and the low noise amplifiers 54B, 55B1, and 55B2 of the first receiver segment 52B are inactive. The dashed lines for the low noise amplifiers 54B, 55B1, and 55B2 in FIG. 4B denote that these low noise amplifiers are inactive. In the first active switching state, different channels of the RHP signal can be processed by mixers, amplifiers, and ADCs of different respective receiver segments.

FIG. 4C illustrates a second active switching state of the communication system 40. An LHP signal can be received and processed in the second active switching state. In the second active switching state, the low noise amplifiers 54A, 55A1, and 55A2 of the first receiver segment 52A are inactive and the low noise amplifiers 54B, 55B1, and 55B2 of the first receiver segment 52B are active. The dashed lines for the low noise amplifiers 54A, 55A1, and 55A2 in FIG. 4C denote that these low noise amplifiers are inactive. In the first active switching state, different channels of the LHP signal can be processed by mixers, amplifiers, and ADCs of different respective receiver segments.

Figure 5:
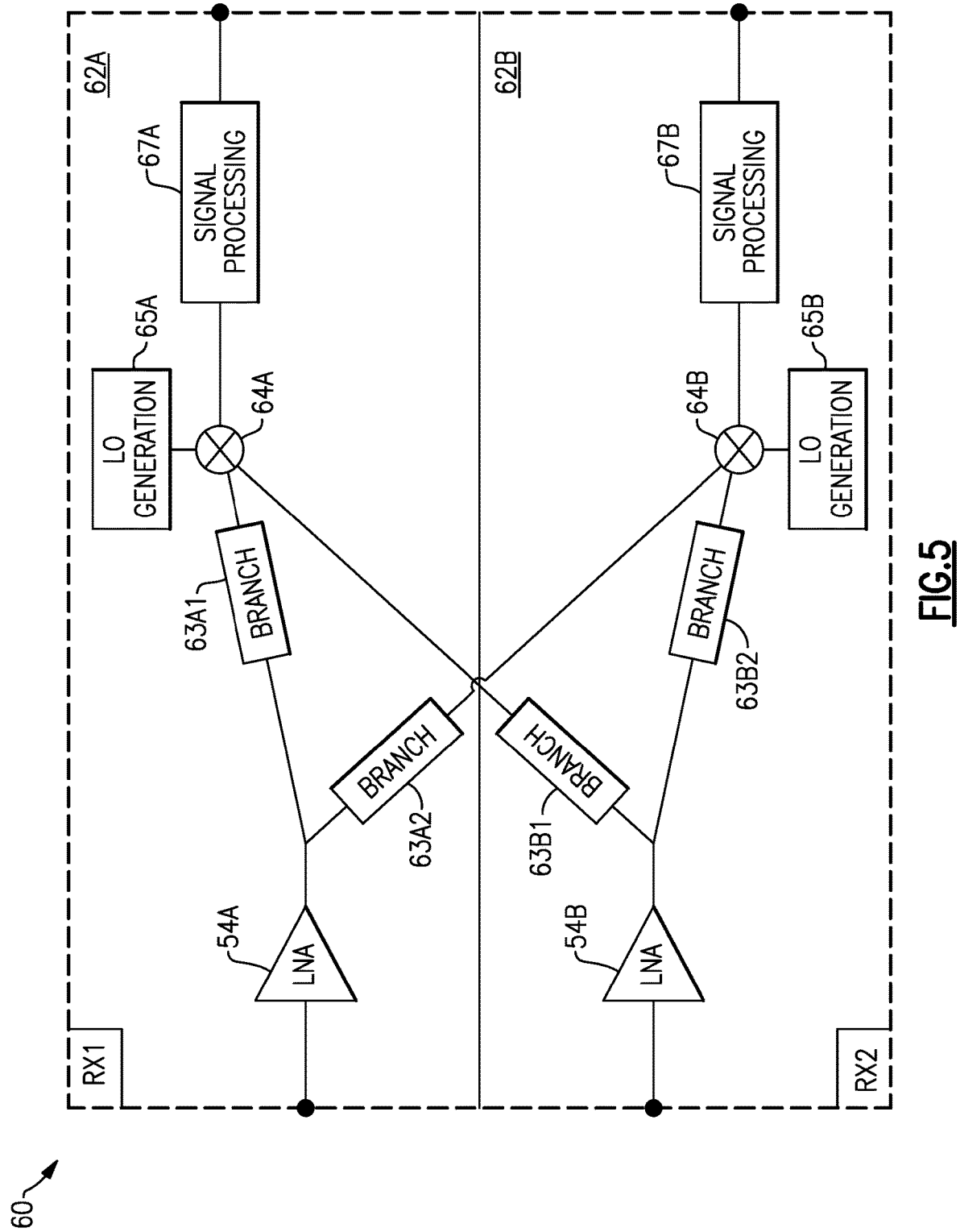
FIG. 5 is a schematic diagram of a segmented receiver according to an embodiment.

FIG. 5 is a schematic diagram of a segmented receiver 60 according to an embodiment. The segmented receiver 60 includes two receiver segments 62A and 62B as illustrated. The architecture of the receiver segments 62A and 62B is scalable for including additional numbers of receiver segments.

The first receiver segment 62A includes a low noise amplifier 54A, branch circuits 63A1 and 63A2, a mixer 64A, a local oscillator 65A, and a signal processing circuit 67A. Similarly, the second receiver segment 62B includes a low noise amplifier 54B, branch circuits 63B1 and 63B2, a mixer 64B, a local oscillator 65B, and a signal processing circuit 67B. In the segmented receiver 60, radio frequency signals can be received and amplified by respective low noise amplifiers 54A and 54B. The radio frequency signals can be orthogonally polarized signals.

Each low noise amplifier 54A and 54B amplifies a radio frequency signal and provides the amplified radio frequency signal to two branch circuits. For example, the first low noise amplifier 54A provides an amplified radio frequency signal to branch circuits 63A1 and 63A2.

The branch circuits 63A1 and 63A2 couple the output of the low noise amplifier 54A to different mixers 64A and 64B of different respective receiver segments 62A and 62B. The branch circuits 63A1 and 63A2 can each include a low noise amplifier and a voltage-to-current converter similar to the segmented receiver 42 of FIG. 4. It will be understood that although FIG. 4A illustrates the voltage-to-current converter 56B1 as being part of the receiver segment 52B, the voltage-to-current converter 56B1 can be considered part a branch circuit of the receiver segment 52A. Similarly, it will be understood that although FIG. 4A illustrates the voltage-to-current converter 56A2 as being part of the receiver segment 52A, the voltage-to-current converter 56A2 can be considered part of a branch circuit of the receiver segment 52B. The branch circuits 63A1 and 63B1 can be actively switched such that a signal from either the branch circuit 63A1 or the branch circuit 63B1 is provided to the mixer 64A. Similarly, the branch circuits 63A2 and 63B2 can be actively switched such that a signal from either the branch circuit 63A2 or the branch circuit 63B2 is provided to the mixer 64B. Any suitable number of branch circuits can be included and coupled to mixers in different receiver segments in accordance with the principles and advantages disclosed herein.

The local oscillators 65A and 65B can be separately tunable to allow the segmented receiver to process two non-adjacent frequency bands.

The signal processing circuits 67A and 67B can process output signals of the mixers 64A and 64B, respectively. The signal processing circuits 67A and 67B can perform any suitable processing functions on down converted signals provided by the mixers 64A and 64B, respectively. For example the signal processing circuits 67A and 67B can perform one or more of amplification, filtering, or analog-to-digital signal conversion. The signal processing circuits 67A and 67B can be baseband circuits.

In some instances, receiver segments of a segmented receiver can each include a digital down converter that includes an RF ADC. Such an RF ADC that can be used to implement a digital mixer. The RF ADC can digitize an RF signal. The RF ADC can perform RF sampling and decimation/down converting. Any suitable principles and advantages disclosed herein can be implemented in segmented receiver that includes an RF ADC that implements a digital mixer. In such instances, the RF ADC can replace an analog mixer, local oscillator, and/or other circuitry of certain embodiments disclosed herein. As an example, an RF ADC can be implemented in place of the mixer 64A, the local oscillator 65A, and analog circuit functions of the signal processing circuit 67A in the receiver segment 62A of FIG. 5.

Figure 6:
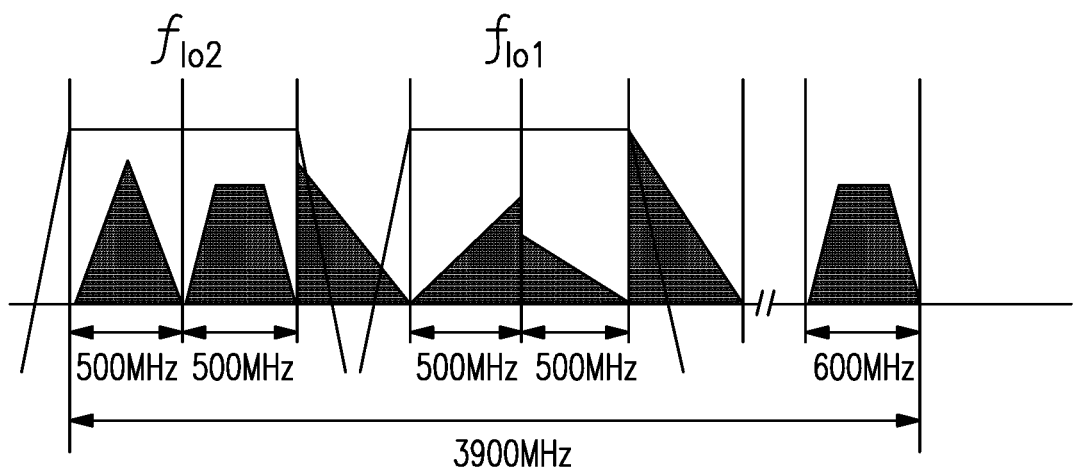
FIG. 6 is a diagram that illustrates that local oscillator signals of receiver segments can be used to receive two sets of two adjacent channels.

Segmented receivers disclosed herein can scale the number of adjacent receive channels by scaling the SerDes speed and/or number of SerDes lanes. FIG. 6 is a diagram that illustrates that local oscillator signals $F_{LO1}$ and $F_{LO2}$ of receiver segments can be used to receive two sets of two adjacent 500 MHz channels. For example, in the segmented receivers of FIGS. 3 and/or 4, each of two receiver segments can be used to receive two adjacent 500 MHz channels simultaneously using local oscillator signals $F_{LO1}$ and $F_{LO2}$.

This can involve doubling the SerDes speed (e.g., to 24.75 Gbps instead of 12.375 Gbps) or doubling the number of lanes (e.g., from 1 to 2) at the same SerDes speed (e.g., of 12.375 Gbps). Accordingly, for the same channel bandwidth, scaling the segmented receiver architectures disclosed can involve increasing the SerDes speed or/and the number of SerDes lanes.

Segmented receivers disclosed herein are modular architectures. Accordingly, such modular architectures can be scaled to aggregate more RF channels (e.g., 500 MHz RF channels) by adding additional receiver channels with independent local oscillators. For example, a 3.9 GHz receiver bandwidth can be doubled using right and left plane orthogonal (RHP/LHP) polarization. Such a receiver can receive any two RF channels (e.g., 500 MHz RF channels) in the 3.9 GHz received band from either orthogonal polarization or both orthogonal polarizations. For example, a segmented receiver can include four receiver segments with independent local oscillators instead of two receiver segments to process the orthogonally polarized signals. RHP and LPF output signals from a polarizer can each be split to a pair of receiver segments to receive up to two receive channels (e.g., 1 GHz RF bandwidth for a 500 MHz receive channel).

Figure 7:
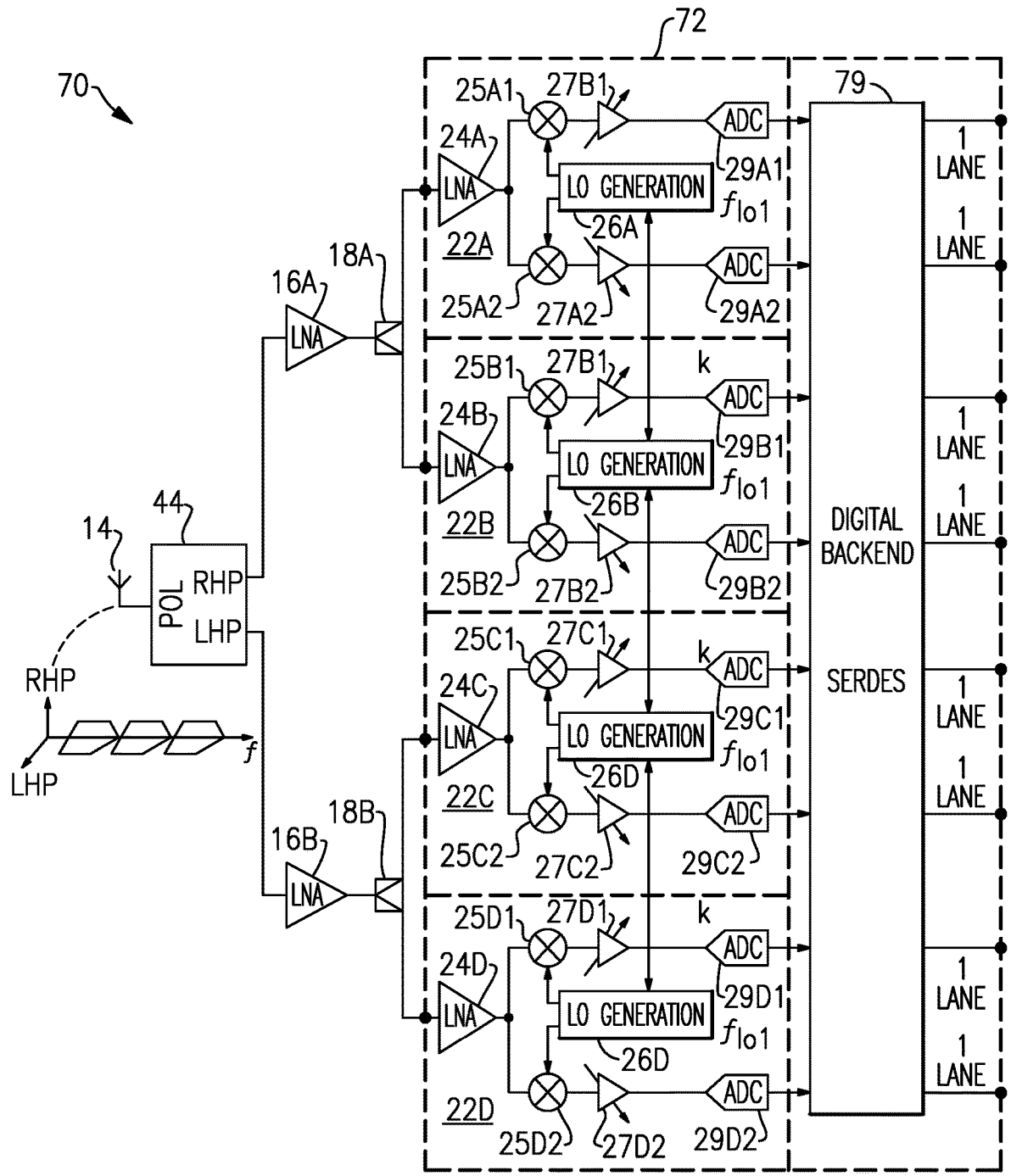
FIG. 7 is a schematic diagram of a communication system that includes a segmented receiver configured to process orthogonally polarized signals according to an embodiment.

FIG. 7 is a schematic diagram of a communication system 70 that includes a segmented receiver 72 according to an embodiment. As illustrated, the communication system 70 includes the segmented receiver 72, an antenna 14, a polarizer 44, a low noise amplifiers 16A and 16B, and signal splitter 18A and 18B. The antenna 14 is configured to receive a radio frequency signal in two orthogonal planes. The polarizer 44 can polarize the radio frequency signal and provide a RHP signal and a LHP signal. The RHP signal and the LHP signal are orthogonally polarized. The low noise amplifier 16A is configured to amplify the RHP signal. The splitter 18A is arranged to split the amplified RHP signal to two different receiver segments of the segmented receiver 72. Similarly, the low noise amplifier 16B is configured to amplify the LHP signal. The splitter 18B is arranged to split the amplified LHP signal to two different receiver segments of the segmented receiver 72.

The segmented receiver 72 includes four similar receiver segments 22A, 22B, 22C, and 22D. These receiver segments function like the receiver segments 22A and 22B of FIG. 3. For instance, a low noise amplifier 24C, mixers 25C1 and 25C2, a local oscillator 26C, transimpedance amplifiers 27C1 and 27C2, and ADCs 28C1 and 28C2 of the third receiver segment 22C can function like the corresponding parts of the first receiver segment 22A. In addition, a low noise amplifier 24D, mixers 25D1 and 25D2, a local oscillator 26D, transimpedance amplifiers 27D1 and 27D2, and ADCs 28D1 and 28D2 of the fourth receiver segment 22D can function like the corresponding parts of the first receiver segment 22A. Each receiver segment includes an independent local oscillator. The receiver segments 22A and 22B can process any two channels of the RHP signal. Similarly, the receiver segments 22C and 22D can process any two channels of the LHP signal. The segmented receiver 72 also includes a SerDes 79 with lanes for the receiver segments 22A, 22B, 22C, and 22D.

Figure 8:
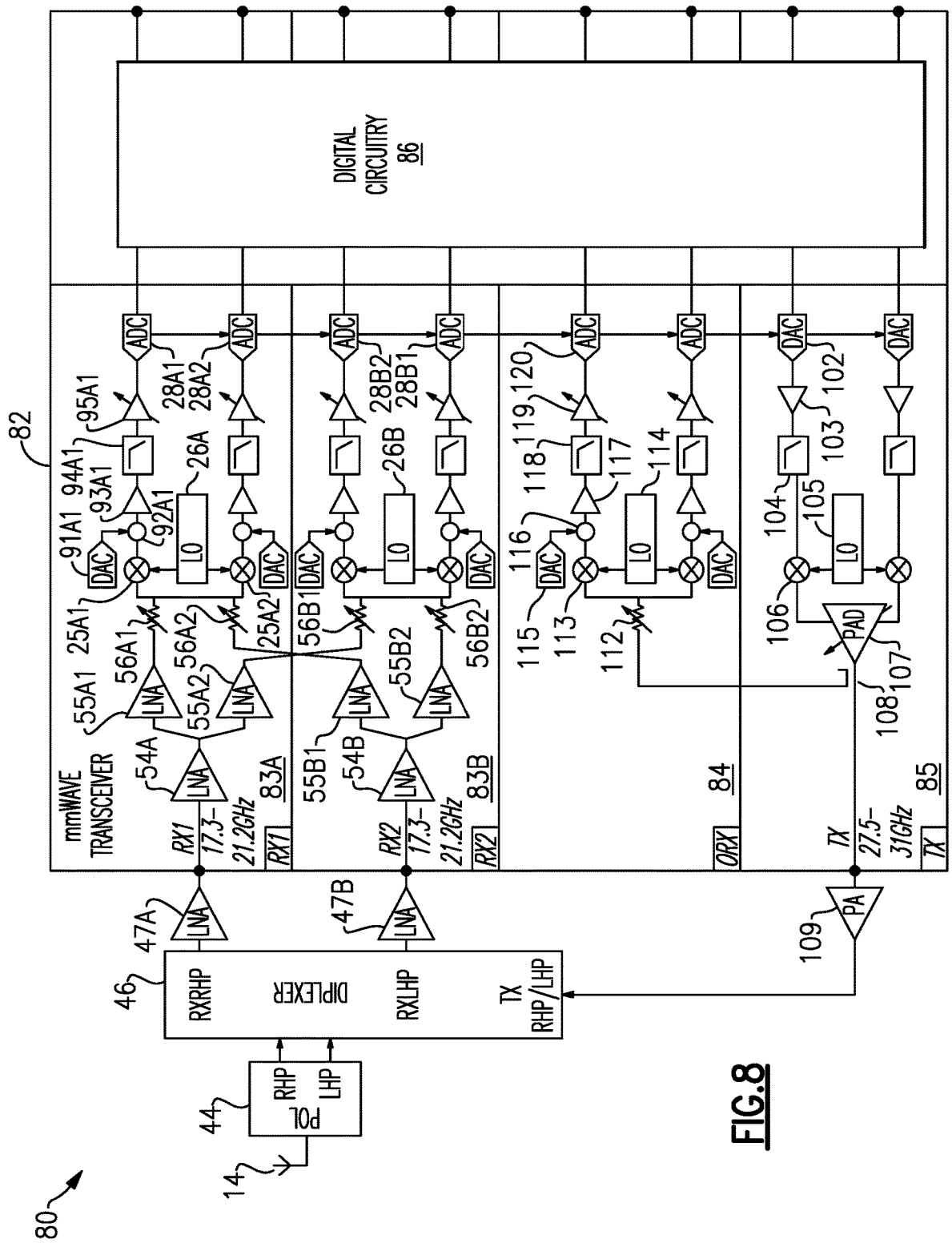
FIG. 8 is a schematic diagram of a communication system that includes a transceiver with a segmented receiver according to another embodiment.

FIG. 8 is a schematic diagram of a communication system 80 that includes a transceiver 82 with a segmented receiver according to an embodiment. The illustrated transceiver 82 is an mmWave transceiver. The transceiver 82 has an architecture to support orthogonal wave polarization. The transceiver 82 includes receiver segments 83A and 83B, an observation receiver 84, and a transmitter 85. As illustrated, the communication system 80 includes the transceiver 82, an antenna 14, a polarizer 44, a diplexer 46, low noise amplifiers 47A and 47B, and a power amplifier 109. The illustrated transceiver 82 can be implemented on a single integrated circuit. Due to integration, the integrated circuit can provide flexible operating modes to trade-off power consumption versus RF bandwidth and/or one or more other parameters.

The antenna 14 is configured to receive a radio frequency signal in two orthogonal planes. The antenna 14 is also configured to transmit a radio frequency signal provided by the power amplifier 109. The polarizer 44 can polarize a radio frequency signal received by the antenna 14 and provide a RHP signal and a LHP signal to the diplexer 46. The RHP signal and the LHP signal are orthogonally polarized. The diplexer 46 is also coupled between the power amplifier 109 and the polarizer 44. The low noise amplifier 47A is coupled to the polarizer 44 by way of the diplexer 46. The low noise amplifier 47A is configured to amplify the RHP signal. The low noise amplifier 47B is coupled to the polarizer 44 by way of the diplexer 46. The low noise amplifier 47B is configured to amplify the LHP signal.

The receiver segments 83A and 83B can implement a direct down-conversion architecture. The receiver segments 83A and 83B can down convert a signal in a frequency range from 17.3 GHz to 21.2 GHz to digital base-band. The receiver segments 83A and 83B are capable of capturing 1 GHz RF bandwidth. Any two 500 MHz baseband channels on either the RH polarization, the LH polarization or both can be received by a segmented receiver that includes the receiver segments 83A and 83B. Active switching can be implemented in the receiver segments 83A and 83B by powering up and powering down low noise amplifiers. Such active switching can involve any suitable features discussed with reference to FIG. 4.

An active switching scheme can provide signals from the two polarization planes to the mixers of the receiver segments 83A and 83B of the transceiver 82. The low noise amplifiers of the receiver segments 83A and 83B can implement active switching, for example, as described with reference to FIG. 4. The receiver segments 83A and 83B are like the receiver segments of 52A and 52B of FIG. 4A except that different processing circuitry is in signal paths between respective mixers and ADCs. For example, in the receiver segment 83A, a digital-to-analog converter (DAC) 91A1 can apply a signal to a combiner 92A1 (e.g., a summing node) between an output of the mixer 25A1 and an input to the transimpedance amplifier 93A1. This can compensate for an offset associated with a mixer and/or local oscillator leakage, for example. In addition, a filter 94A1 is coupled between transimpedance amplifier 93A1 and variable gain amplifier 95A1 in the receiver segment 83A. The filter 94A1 can be a low pass filter, such as a third order low pass filter. The filter 94A1 and the transimpedance amplifier 93A1 can reject a blocker at the RF channel edge of 300 MHz. The output of the variable gain amplifier 95A1 is coupled to an input of the ADC 28A1.

The digital circuitry 86 can implement integrated offset correction loop (OCL), automatic gain control (AGC), quadrature error correction (RXQEC), the like, or any suitable combination thereof for the receiver segments 83A and 83B. The digital circuitry can include two SerDes lanes of 12.375 Gbps per receiver segment 83A or 83B.

The transmitter 85 can provide direct up-conversion from digital base band to a frequency in a range from 27.5 GHz to 31 GHz in the Ka band. As illustrated, the transmitter 85 includes an I channel and a Q channel arranged to receive digital signals from the digital circuitry 86. The functionality of the I channel processing will now be described, and the Q channel can operate similarly for a Q signal. A digital signal from the digital circuitry 86 is converted to an analog signal by the DAC 102. The DAC 102 can be used to meet transmit emission specifications. The DAC 102 can be a 4 gigasamples per second (GSps) DAC is certain applications. The output of the DAC 102 is amplified by a transimpedance amplifier 103 and then filtered by a baseband filter 104. The baseband filter 104 can support a 250 MHz baseband bandwidth to filter out DAC images in certain applications. A local oscillator 105 generates a local oscillator for the mixer 106 to up convert the output from the baseband filter 104. A power amplifier driver 107 provides an amplified radio frequency signal to the power amplifier 109. A directional coupler 108 can provide a sample of the amplified radio frequency signal to the observation receiver 84.

The observation receiver 84 can receive the sample of the transmitter output signal from the transmitter 85. The observation receiver 84 can down converts the sampled transmitter output signal to the digital domain to perform transmit calibrations, such as transmit quadrature error correction (QEC) and/or local oscillator leakage compensation.

As illustrated, the observation receiver 84 includes a voltage-to-current converter 112 configured to receive the sample of the transmitter output signal and provide currents to an I path and a Q path of the observation receiver 84. The functionality of the I path processing will now be described, and the Q path operates similarly for a Q signal. The mixer 113 receives a local oscillator signal from the local oscillator 114 and down coverts the output of the voltage-to-current converter 112. A DAC 115 can apply a signal to a combiner 116 (e.g., a summing node) between an output of the mixer 113 and an input to a transimpedance amplifier 117. A filter 118 is coupled between transimpedance amplifier 117 and variable gain amplifier 119. The filter 118 can be a low pass filter, such as a third order low pass filter. The output of the variable gain amplifier 119 is coupled to an input of the ADC 120. The ADC 120 provides a digital signal to the digital circuitry 86. The digital circuitry 86 can perform transmit calibrations for the transmitter 85 based on digital signals received from the observation receiver 84.

Figure 9:
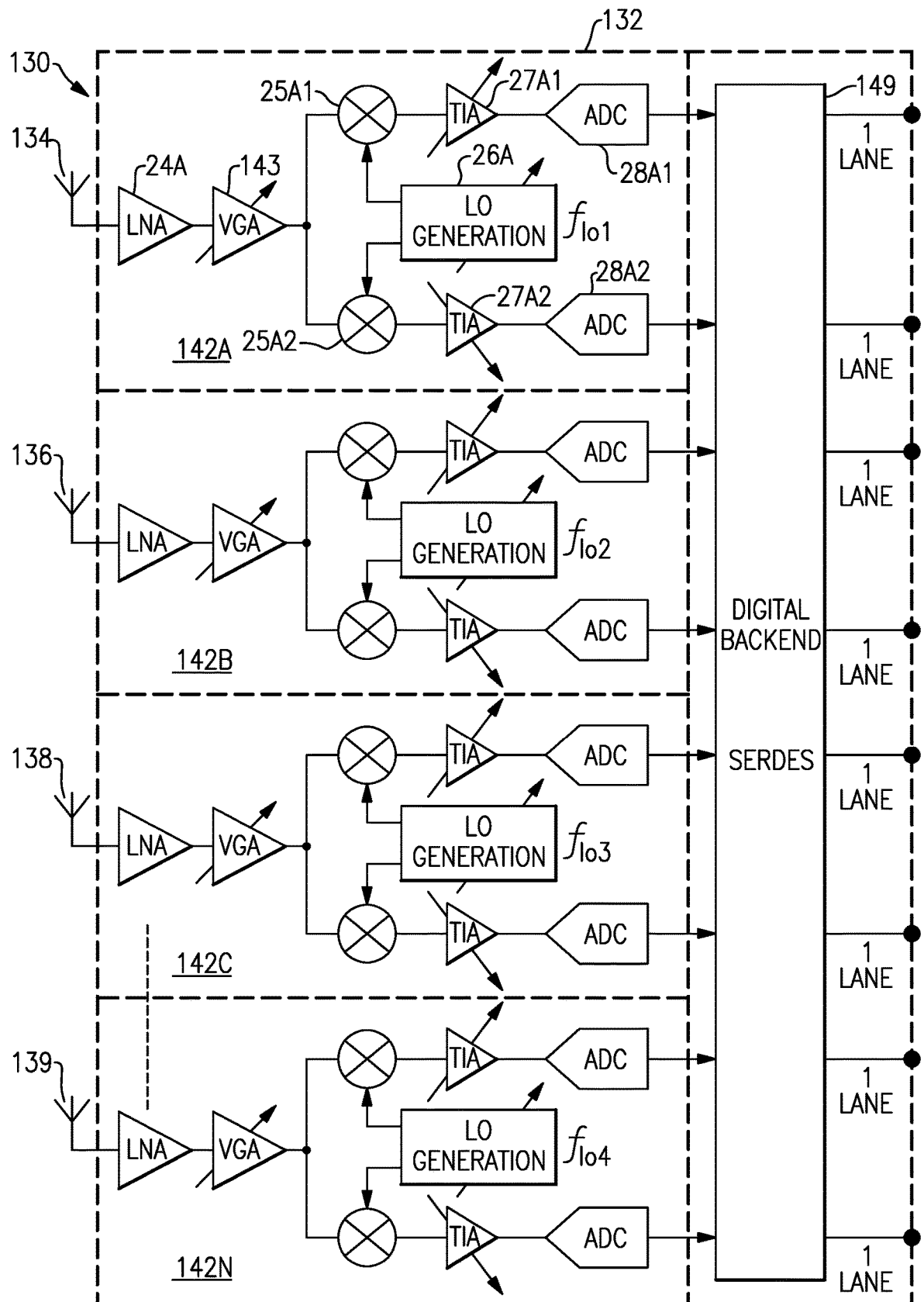
FIG. 9 is a schematic diagram of a communication system that includes a segmented receiver that can be used in beamforming applications according to an embodiment.

FIG. 9 is a schematic diagram of a communication system 130 that includes a segmented receiver 132 that can be used in beamforming applications according to an embodiment. The communication system 130 includes the segmented receiver and antenna elements 134, 136, 138, and 139. As illustrated, each of the antenna elements 134, 136, 138, and 139 is coupled to an input of a different receiver segment of the segmented receiver 132. The illustrated segmented receiver 132 includes receiver segments 142A, 142B, 142C, and 142N. Any suitable number of receiver segments can be included in a segmented receiver arranged for beamforming applications. The segmented receiver 132 also includes a SerDes 149 with lanes for the receiver segments 142A, 142B, 142C, and 142N. The receiver segment 142A is similar to the receiver segment 22A discussed above, expect that a variable gain amplifier 143 is included between low noise amplifier 24A and mixers 25A1 and 25A2. Receiver segments 142B, 142C, and 142N are similar to the receiver segment 142A.

Digital beamforming solutions for 5G base stations can have several technical challenges. Design specifications can include low power consumption for each of the receive and transmit channels, a highly linear mmWave front end, a wide ADC dynamic range, and a small size. The communication system 130 can be used for digital beamforming based on independent local oscillator generation circuits in different receiver segments that can be independently tuned. A multi-chip synchronization block can synchronize on-chip local oscillator generators to the same reference clock. Instead of using an mmWave phase shifter, phase shifting can be performed using each of the independent frequency synthesizers of the receiver segments. This can reduce one or more of noise, linearity, or power consumption of the mmWave phase shifters.

A similar approach to digital beamforming using the segmented receiver 132 can be adopted for transmitters where independent phase control can be performed on each of the transmitters using independent local oscillators. Moreover, digital beamforming can be implemented with segmented receivers in accordance with the principles and advantages disclosed in connection with one or more of FIGS. 4, 5, 7, and 8. For example, segmented receivers arranged for digital beamforming can be arranged to process orthogonally polarized signals received at each antenna element of an array of antenna elements. This can involve polarizing a radio frequency signal received at the antenna element and processing the orthogonally polarized signals with two receiver segments. In some such instances, the receiver segments can include branch circuits in accordance with any suitable principles and advantages discussed with reference to FIG. 4A to 4C and/or FIG. 5.

This disclosure provides segmented receiver architectures. A receiver segment can process a receive channel within a receive bandwidth without processing the entire receive bandwidth. Different segmented receivers can include independent local oscillators, and the different receiver segments can process different receiver bands of the receive bandwidth including non-adjacent receive channels. Having a receiver segment process a receive channel instead of an entire receive bandwidth can relax design specifications for an ADC of the receiver segment. The entire mmWave-to-bits signal chain can be implemented on a single chip. Segmented receivers disclosed herein are scalable in terms of bandwidth versus number of receiver segments. Each doubling of the number of receiver segments can double the number of adjacent or non-adjacent channels that can be received by the segmented receiver. Segmented receiver architectures disclosed herein support orthogonal polarization using two receiver channels with active switching instead of explicit switches at mmWave frequencies. Segmented receiver architectures disclosed herein can be used in digital beamforming applications. With the availability of an independent local oscillator generator for each receiver/transmitter, an mmWave phase shifter can be eliminated and phase shifting can be performed using a frequency synthesizer.

Any of the principles and advantages discussed herein can be applied to other systems, devices, integrated circuits, electronic apparatus, or method, not just to the embodiments described above. The elements and operations of the various embodiments described above can be combined to provide further embodiments. The principles and advantages of the embodiments can be used in connection with any other systems, devices, integrated circuits, apparatus, or methods that could benefit from any of the teachings herein. The technology described herein can be implemented in any suitable wireless communication device or system configured to receive radio frequency signals.

Aspects of this disclosure can be implemented in various electronic devices. Examples of the electronic devices can include, but are not limited to, satellite communication receivers, consumer electronic products, parts of electronic products such as integrated circuits, electronic test equipment, wireless communication devices, communications infrastructure such as a base station, vehicular electronics such as automotive electronics, etc. Further, the electronic devices can include unfinished products.

Unless the context indicates otherwise, throughout the description and the claims, the words "comprise," "comprising," "include," "including," and the like are to generally be construed in an inclusive sense, as opposed to an exclusive or exhaustive sense; that is to say, in the sense of "including, but not limited to." The word "coupled," as generally used herein, refers to two or more elements that may be either directly coupled to each other, or coupled by way of one or more intermediate elements. Likewise, the word "connected," as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural may also include the plural or singular, respectively. The word "or" in reference to a list of two or more items, is generally intended to encompass all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding whether these features, elements and/or states are included or are to be performed in any particular embodiment.

While certain embodiments have been described, these embodiments have been presented by way of example only, and are not intended to limit the scope of the disclosure. Indeed, the novel methods, apparatus, systems, devices, and integrate circuits described herein may be embodied in a variety of other forms; furthermore, various omissions, substitutions and changes in the form of the methods, apparatus, and systems described herein may be made without departing from the spirit of the disclosure. For example, circuit blocks described herein may be deleted, moved, added, subdivided, combined, and/or modified. Each of these circuit blocks may be implemented in a variety of different ways. The accompanying claims and their equivalents are intended to cover any such forms or modifications as would fall within the scope and spirit of the disclosure.

What is claimed is:

1. A segmented receiver for a wireless communications system, the segmented receiver comprising:
    a first receiver segment comprising a first input node configured to receive a radio frequency signal, a first branch circuit coupled to the first input node, a second branch circuit coupled to the first input node, a first mixer, and a first local oscillator in communication with the first mixer; and
    a second receiver segment comprising a second input node configured to receive a second radio frequency signal, a third branch circuit coupled to the second input node, a fourth branch circuit coupled to the second input node, a second mixer, and a second local oscillator in communication with the second mixer;
    wherein the second local oscillator is separately controllable from the first local oscillator; and
    wherein an output of the first branch circuit is coupled to an input of the first mixer, the second input node is coupled to the input of first mixer via the third branch circuit, an output of the second branch circuit is coupled to an input of the second mixer, and the first input node is coupled to the second mixer via the fourth branch circuit.

2. The segmented receiver of claim 1, wherein the first branch circuit comprises a first low noise amplifier, and the second branch circuit comprises a second low noise amplifier.

3. The segmented receiver of claim 2, wherein the third branch circuit comprises a third low noise amplifier, and the fourth branch circuit comprises a fourth low noise amplifier.

4. The segmented receiver of claim 3, wherein the segmented receiver is configured to perform active switching to power down the first low noise amplifier such that the first low noise amplifier is powered down while the third low noise amplifier is powered on.

5. The segmented receiver of claim 2, wherein the first branch circuit further comprises an adjustable voltage-to-current converter coupled between the first low noise amplifier and the first mixer.

6. The segmented receiver of claim 1, wherein the radio frequency signal and the second radio frequency signal are orthogonally polarized signals.

7. The segmented receiver of claim 1, wherein the radio frequency signal has a frequency in a range from 17.3 gigahertz to 21.2 gigahertz.

8. The segmented receiver of claim 1, wherein the segmented receiver is configured to concurrently process a first bandwidth of the radio frequency signal using the first mixer and a second bandwidth of the radio frequency signal using the second mixer.

9. The segmented receiver of claim 8, wherein the first bandwidth and the second bandwidth each span at least 300 megahertz.

10. The segmented receiver of claim 1, wherein the first receiver segment comprises an input low noise amplifier having an input coupled to the first input node and an output split to the first branch circuit and the second branch circuit.

11. A method of processing a received radio frequency signal in a segmented receiver, the method comprising:
    receiving the radio frequency signal at an input node of a first receiver segment;
    processing the radio frequency signal in a first branch circuit and a second branch circuit of the first receiver segment;
    down converting the radio frequency signal using a first mixer of the first receiver segment, wherein the first mixer has an input coupled to an output of the first branch circuit, and wherein the first mixer receives a first local oscillator signal from a first local oscillator of the first receiver segment; and
    down converting the radio frequency signal using a second mixer of a second receiver segment, wherein the second mixer has an input coupled to an output of the second branch circuit, wherein the second mixer receives a second local oscillator signal from a second local oscillator of the second receiver segment, and wherein the second local oscillator is independent of the first local oscillator.

12. The method of claim 11, further comprising:

processing a first bandwidth of the radio frequency signal using circuitry coupled to an output of the first mixer; and processing a second bandwidth of the radio frequency signal using circuitry coupled to an output of the second mixer, wherein the first bandwidth and the second bandwidth are spaced apart in a frequency domain.

13. The method of claim 11, further comprising:

powering down circuitry of the first branch circuit and the second branch circuit of the first receiver segment; and while the circuitry of the first branch circuit and the second branch circuit of the first receiver segment are powered down, processing a second radio frequency signal in a third branch circuit of the second receiver segment, wherein the first mixer has a second input coupled to an output of the third branch circuit.

14. The method of claim 11, further comprising providing a second radio frequency signal to a second input node of the second receiver segment, wherein the radio frequency signal and the second radio frequency signal are orthogonally polarized.

15. The method of claim 11, wherein the radio frequency signal has a frequency in a range from 17.3 gigahertz to 21.2 gigahertz.

16. A radio frequency system with a segmented receiver for a wireless communications system, the radio frequency system comprising:

a polarizer configured to provide a first radio frequency signal at a first polarizer node and a second radio frequency signal at a second polarizer node, wherein the first radio frequency signal and the second radio frequency signal are orthogonally polarized;

a first receiver segment comprising a first input node electrically connected to the first polarizer node, a first low noise amplifier coupled to the first input node, a second low noise amplifier coupled to an output of the first low noise amplifier, a third low noise amplifier coupled to the output of the first low noise amplifier, and a first mixer; and a second receiver segment comprising a second input node electrically connected to the second polarizer node, a fourth low noise amplifier coupled to the second input node, a fifth low noise amplifier coupled to an output of the fourth low noise amplifier, a sixth low noise amplifier coupled to the output of the fourth low noise amplifier, and a second mixer;

wherein an output of the second low noise amplifier and an output of the fifth low noise amplifier are coupled to an input of the first mixer; and wherein an output of the third low noise amplifier and an output of the sixth low noise amplifier are coupled to an input of the second mixer.

17. The radio frequency system of claim 16, further comprising a diplexer coupled between the first polarizer node and the first input node and also coupled between the second polarizer node and the second input node.

18. The radio frequency system of claim 16, wherein the first receiver segment comprises a local oscillator electrically connected to the first mixer, and wherein the local oscillator is configured to perform phase shifting.

19. The segmented receiver of claim 1, wherein the first input node is electrically coupled to an input low noise amplifier, and an output of the input low noise amplifier is coupled to a first low noise amplifier of the first branch circuit and a second low noise amplifier of the second branch circuit.

20. The method of claim 12, wherein the first bandwidth and the second bandwidth each span at least 300 megahertz.

* * * * *